United States Patent [19]
Johnson et al.

[11] Patent Number: 5,271,697
[45] Date of Patent: Dec. 21, 1993

[54] TAP AND QUICK CHANGE TAP HOLDER ASSEMBLY

[75] Inventors: Allan S. Johnson, Newport Beach, Calif.; Peter Brandenberger, Erlenbach, Switzerland

[73] Assignee: Tapmatic International Corporation (TIC AG), Kriessern, Switzerland

[21] Appl. No.: 826,265

[22] Filed: Jan. 23, 1992

Related U.S. Application Data

[63] Continuation of Ser. No. 584,486, Sep. 17, 1990, abandoned, which is a continuation of Ser. No. 437,774, Nov. 20, 1989, abandoned, which is a continuation of Ser. No. 66,313, Jun. 25, 1987, abandoned.

[51] Int. Cl.$^5$ .................... B23B 51/00; B23B 5/22; B23B 5/46
[52] U.S. Cl. ..................... 408/222; 279/75; 408/226; 470/198
[58] Field of Search ............ 408/226, 240, 239 R, 408/222; 279/75, 905; 470/198

[56] References Cited

U.S. PATENT DOCUMENTS

| | | | |
|---|---|---|---|
| 1,398,156 | 11/1921 | Schroder | 408/226 |
| 1,793,259 | 2/1931 | Smeuninx | 470/198 |
| 2,807,473 | 9/1957 | Kiehne | 279/75 |
| 2,974,965 | 3/1961 | Welles, Jr. | 408/226 |
| 3,589,826 | 6/1971 | Fenn | 408/226 |
| 4,209,182 | 6/1980 | Sheldon | 279/75 |
| 4,234,277 | 11/1980 | Benson et al. | 408/226 |
| 4,290,617 | 9/1981 | Yoshida | 279/75 |
| 4,692,073 | 9/1987 | Martindell | 279/75 |

*Primary Examiner*—Bruce Y. Arnold
*Assistant Examiner*—Darryl Collins
*Attorney, Agent, or Firm*—Joseph R. Evanns

[57] ABSTRACT

The invention provides an improved standardized blank adapted for making taps for making tapped holes and an improved positive lock tap holder. A standardized tap blank is provided which is standardized as to diameter, overall length, and shank length. Such a blank is adapted to manufacture a wide range of taps of varying thread sizes, both U.S. and British standards, and metric standard. For broadening the range of capacities that the blanks are adapted for, a set is provided including two additional standardized blanks, standardized as to a different diameter shank length and overall length. Each standardized blank is provided with a square end, standardized as to the square sides and overall length. The standardized tap blanks are further provided with an annular groove to for holding balls. The annular groove is provided at a precise predetermined distance from the radial shoulders at the inner part of the square end to assure that the axial thrust acting on the tap will be taken by the radial shoulders rather than the balls. The quick release holder is provided with a ball holder which is a positive lock ring which can hold the balls in the annular groove in the tap and release them from it. The lock ring is positively held against rotation. The holder's structure can be built into the driver or tapping attachment itself.

7 Claims, 2 Drawing Sheets

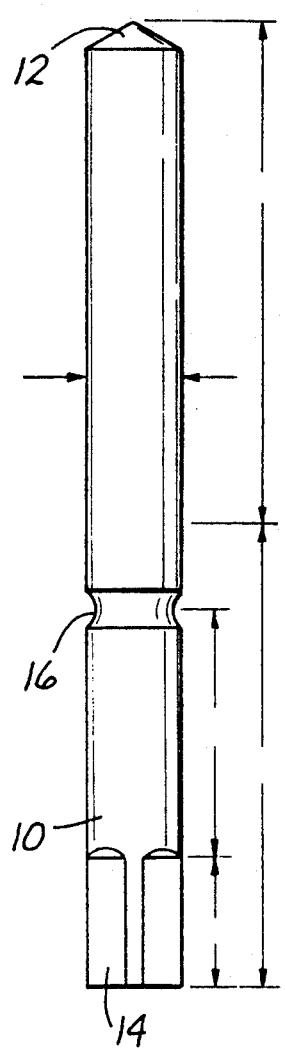
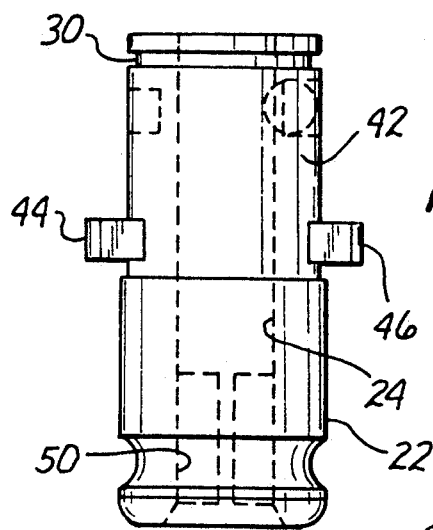
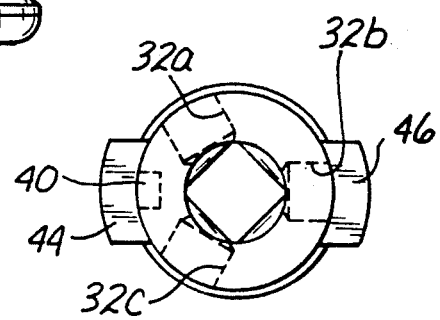
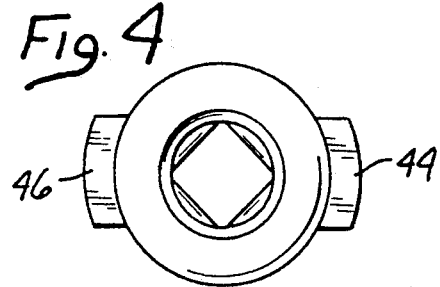
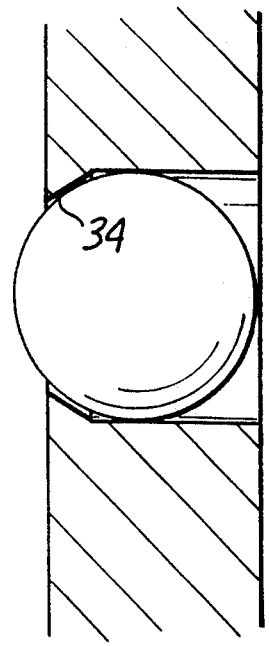
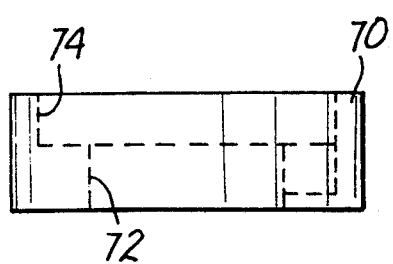

TAP AND QUICK CHANGE TAP HOLDER ASSEMBLY

This application is a continuation of application serial number 07/584,486 filed on Sep. 17, 1990, now abandoned, which is a continuation of application Ser. No. 07/437,774 filed on Nov. 20, 1989, now abandoned, which is a continuation of application Ser. No. 07/066,313, now abandoned.

BACKGROUND OF THE INVENTION

1. Field of the Invention

The field of the invention is that of taps for making tapped holes and quick change tap holders as used with the taps.

2. Description of the Prior Art

The art of taps for making tapped holes, quick change holders or adapters for taps, and tapping apparatus, that is, tapping attachments, is well-developed.

A need exists, however for improvements, and this need will be addressed herein.

In the industry, both domestically and abroad, there is a great variety of tapping apparatus or tapping attachments, and particularly, there is a great variety of taps as to styles, thread sizes (inch and metric), over-all lengths, shank and square sizes, to a variety of standards, American, British and Metric. What is not available is what might be called an international standard tap or tap blank which would accommodate itself to the great variety of needs for a tap. This is a need, the filling of which would be of very substantial benefit to the industry.

There is presently available quick change holders or adapters for holding taps, the adapters being constructed for quick change from one tap to another of the same size. The holders or adapters serve the purpose of accommodating the tap to be driven to a particular machine, such as a drill press or a tapping attachment. Typically, in the known art, the shank of the tap is held in the holder or adapter by way of circularly arranged balls that press in radially directly against the cylindrical surface of the shank of the tap. A disadvantage exists in this construction in that the holding force that can be applied is limited and the possibility of slippage or accidental pull-out.

A very great advantage would be if all thread sizes of taps, both U.S. standard and British standard, and metric standards could be made on or from the same blanks, and all would have the same overall length and shank diameters and squares, it could truly be an international standard for CNC applications, that is, Computer Numerical Control applications. The need for realization of these advantages, the object of realizing these advantages, and the actual realization appears hereinafter.

A preferred form of the herein invention appears hereinafter, the invention being intended to fill the needs referred to in the foregoing, as well as other needs.

SUMMARY OF THE INVENTION

In a preferred form of the invention, a tap is provided or a tap blank which is standardized so as to accommodate itself to a large variety of applications or, on the other hand, a relatively small group of standardized taps that accommodate themselves to a wide variety of applications which are applications that call for a different length and/or a different diameter of tap. Typically, taps are provided with an end of square configuration adapted to be received in a square hole in the tap holder or adapter, or in the spindle of the driving machine itself. In the standardized tap or group of standardized taps referred to, the square end is also standardized so that the purpose is realized of enabling the tap or group of taps to accommodate large varieties of different applications.

A further improvement in the tap resides in its being provided with an annular ball-receiving groove. Typically, tap holders or adapters are provided with a set of balls that are forced radially against the cylindrical surface of the shank of the tap for holding it in position. The annular groove as referred to is positioned to receive the balls that are urged inwardly radially, and the positive engagement of the balls in the groove prevents the tap from accidentally pulling out of the tap adapter during tapping operation.

The tap or tap shank is constructed with a square at one end to be received in a square hole in the adapter or in the driver. The square at the end of the cylindrical shank provides a flat radial shoulder or shoulders adjacent to the flat sides of the square end. Also, radial shoulders appear at the bottom of the square hole referred to. The axial center of the annular groove is positioned with precision with respect to the said shoulder or shoulders. The result is that when the tap in the hole encounters resistance, the thrust is taken by the said shoulders adjacent to the flat sides of the square driving spindle and the radial shoulders at the end of the square hole rather than by the balls. The result is that there is provided positive thrust to start the tap, absorbed by solid shoulders and not by the balls in the annular groove.

Thus, an improvement has been made in the tap itself and its cooperation with the tap holder or adapter.

The invention provides a further improvement in the holder or adapter. The balls carried by the adapter are positioned to be moved inwardly radially by way of a circular fitting that moves axially. This fitting is biased by axially positioned springs. The improvement resides in that slots are provided on the inside of the fitting at the position where the fitting engages the balls to move them inwardly, the slots serving the purpose of preventing rotating of the fitting and the balls about the axis of the tap and the holder. This is important when the adapter is used with self-reversing tapping attachments, where reverse may be instantaneous at speeds up to 5000 r.p.m.

In a slightly modified form of the holder or adapter, it is constructed so as to be axially built in to the driving machine or tapping attachment, that is, it is constructed as a part of the driving spindle.

The objects of the invention include realization of various advantages. These include standardization at one length for easy programming, standardization of one diameter shank for a range of tap sizes encompassing both metric and inch standards, and the capability of quick change without adapters in that the tap fits directly into the spindle of the tapping unit resulting in better concentricity and positive lock, that is, the tap cannot pull out, and the realization of a tap adapter that can be made to hold the tap which would be adaptable to all existing tapping units with quick change. A manufacturer utilizing the invention and its advantages would gain additionally a tremendous reduction in the inventory of tap adapters that are required to be kept on hand, that is, only three standard adapters would be required to accommodate a full range from zero to 13/16's inches in diameter and the metric equivalents as opposed to more than 100 as of the present time to handle all of the various shank standards currently in use throughout the world. It follows that a tap manufacturer, by adopting the international N/C standards identified, is able to penetrate many new markets throughout the world by way of a relatively simple manufacturing program, that is, such manufacturer would be able to promote advantages beyond the mere performance of the tap and from a manufacturing standpoint would enjoy the advantage of having all blanks the same up to a certain point in the manufacturing process, thereby reducing costs.

A primary object of the invention is to make available a tap and/or a tap blank which is of a construction as to length, diameter and size of the square end so as to constitute standard, which accommodates itself to a wide variety of applications, having reference to usage that is to be made of it, particularly as to threads, thread sizes, adapters, and drives for the tap.

A further object is to provide an improved tap which is standardized as to length, diameter, and size of the square at its end.

A further object is to realize a group of taps standardized as in the foregoing which accommodate to a very wide variety of applications.

A further object is to realize a standardized tap as in the foregoing which is provided with an annular groove to receive the balls of the holder or adapter and which annular groove is positioned with precision at a predetermined axial distance from the radial shoulders at the end of the driving spindle adjacent to the flat sides of the square end. This object realizes the advantages of providing positive lock between the tap and the tap holder and that the axial thrust on the tap is taken by the radial shoulders adjacent to the sides of the square end rather than by the balls themselves which move into the annular groove.

Another object is to realize the foregoing improvements in the holder, which is built into the driving machine or tapping attachment.

BRIEF DESCRIPTION OF THE DRAWINGS

FIG. 1 is a view of a preferred form of a standard tap shank showing exemplary dimensions in this illustrative form;

FIG. 2 is a side view of the body of tap adapter shank;

FIG. 3 is an end view of the shank of FIG. 2;

FIG. 4 is an opposite end view of the shank of FIG. 2 showing the square hole;

FIG. 4A is a view of the lock ring;

FIG. 5 is a cross-sectional view of a part of one of the holes that receives a holding ball;

FIG. 6 is a sectional view of the spring retaining ring;

DESCRIPTION OF A PREFERRED EMBODIMENT AND BEST MODE OF PRACTICE OF THE INVENTION

FIG. 1 of the drawings shows, as an example, preferred form of a standard tap, or rather, tap blank. It includes a cylindrical body 10 which extends to a point 12 at one end. At the opposite end is a square as shown at 14, having four flat sides.

At an intermediate point is an annular groove 16 adapted to receive holding balls. With respect to this preferred exemplary example of a standard tap blank, the dimensions are given in milimeters, the dimensions including the diameter of the shank; the shank length extension beyond the shank; and the axial length of the square end. The length between the axial center of the annular groove 16 and radial shoulders at the inner end of the square 14 are also given. To accommodate a very large variety of applications of taps, there will be perhaps three standard forms of blanks which would all be alike except for dimensions.

FIG. 2 is a sectional view of a preferred form of the body of a quick-change adapter for taps. The adapter is used between the tap or driver or tapping attachment or machine and provides for the quick-change from one tap to another. The adapter as shown can accommodate a wide variety of drivers and taps.

Figure 9:
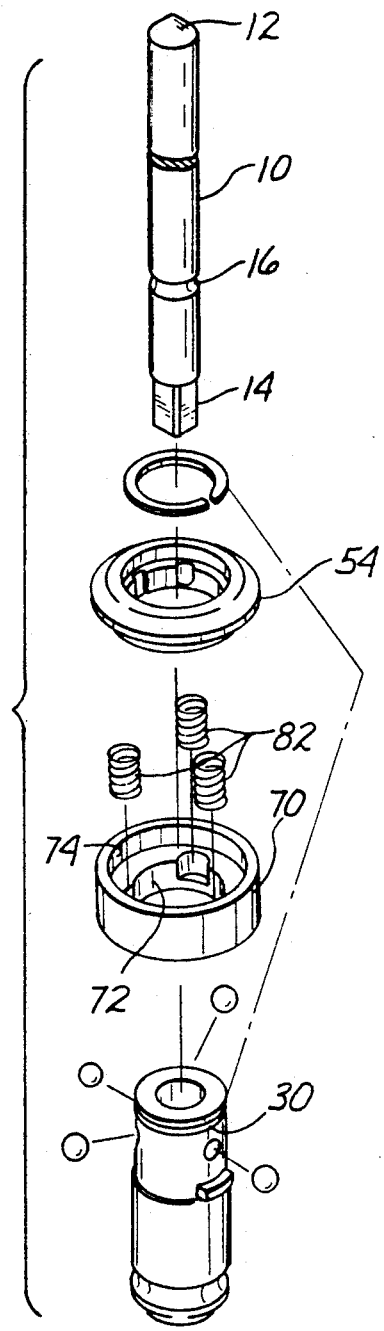
FIG. 9 is an exploded isometric view of the tap and the adapter.
Figure 7:
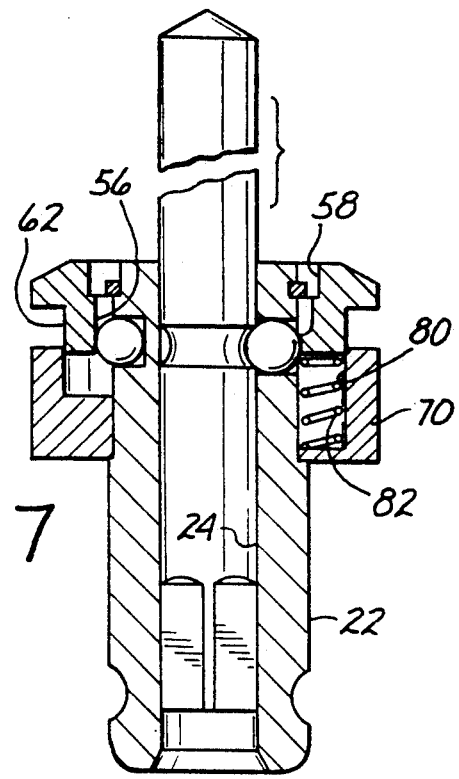
FIG. 7 is a cross-sectional view of the quick-change adapter in the assembled form with the tap blank of FIG. 1 in position.

End views of the body are shown in FIGS. 3 and 4, and the assembled parts are shown in FIG. 7.

The adapter as shown in FIGS. 2-7 includes a body 22 of appropriate diameter. The body has a bore 24 of a diameter to receive the shank of a tapping attachment at the upper end. Just below the end is an annular groove 30, adapted to receive a holding ring as may be seen in FIG. 7.

Below the top of the body 22, the body is provided with three radial holes 32a, b and c spaced 120° apart. These holes do not proceed all the way through the sides of the body 22, but rather their inner ends taper such as shown at 34 in FIG. 5 so that a ball is restrained from going all the way through. In this part of the body 22 there is a further single radial hole or recess 40 for a small ball to keep the unlocking collar from slipping (rotating).

In FIG. 2, body 22 is shown having a diameter of 11.5.

The body 22 has a pair of radially extending lugs 44 and 46 adapted to engage with openings or lugs within the spindle of the driver or attachment for transmitting rotation to the adapter.

As explained, in the bottom end of the adapter body 22, there is provided a square hole 50 into which can be received the square end 14 of the tap as shown in FIG. 1.

FIG. 4A shows the positive lock ring 54 which can also be seen in the assembled view of FIG. 7. It has a diameter or a bore 56 and a larger counter-bore 58, bore 56 being of a size to fit over the outside of the body 22. The positive lock ring has an extending skirt 62 which has a bore of a size to fit around the outside of the three balls, that is, of a size to fit around the balls that fit into the previously-described radial bores 32a, 32b, and 32c, as may be seen in FIG. 7. Provided on the inside of the skirt 62 are axial slots formed by ribs spaced 120° apart which are engageable with the balls to prevent the positive lock ring from rotating with respect to the body 22 and the balls. At the upper end of the vertical slots there are provided slight ramps so that as the skirt of the positive slot ring is moved upwardly, the balls are urged inwardly into the annular groove 16 of the tap to securely lock it into position, and as the ring is moved against the springs, the pressure on the balls is released.

FIG. 6 shows the spring-retaining ring 70. This ring has a bore 72 having a size to fit over the body 22 and a counter-bore 74 to receive the skirt 62 of the positive lock ring that fits down into it. The spring ring has three axial bores spaced 120° from each other and one of which may be seen at 80 in FIG. 7 having a biasing spring 82 in it.

From the foregoing it may be seen that the positive lock ring 54 may be urged downwardly into the spring ring 70 so that the vertical ribs on the inside of the skirt 62 of the positive lock ring will release the balls inwardly from the annular groove 16 in the tap so as to release it. Normally, the balls are held in annular groove 16 to lock the tap in position.

From the foregoing it is to be observed that when the tap/tap blank is in position in the bore, the three balls in the bores 32a, b and c come into position in the annular groove 16 to hold the tap in position. When the positive holding ring 54 is moved axially against the springs, the radial pressure on the balls is released, allowing them to move outward radially so that the tap is released.

It is significant that when the tap is positioned, the square end 14 which it is to be observed provides for the radial shoulders adjacent the flat sides of the square come up against the radial shoulders at the inner end of the square hole 50 in the end of the body 22. As previously explained, the axial center of the annular groove 16 is positioned with precision with respect to the radial shoulders in the tap at the end of the square part and, similarly, the square shoulders at the inner end of the square hole in the body 22.

The positioning of the annular groove is critical. There is end thrust involved when the point of the tap comes in contact with the drilled hole. This end thrust is taken up by the shoulders previously described at the inner end of the square hole in the body 22, and the radial shoulders on the tap shank at the inner end of the square end. The thrust is taken here rather than on the balls themselves. The end thrust can be quite severe at times, for example, when the tap becomes dull. The duller the tap is, the more end thrust required to start the tap in the drilled hole. This end thrust could be too much for the balls and annular groove to take up, that is, the balls reacting against the radius of the annular groove would be forced outwardly toward the element which is holding them in position. This thrust could be sufficient to deform the positive locking ring holding the balls in place, or in severe applications, actually break it. Also, the location of the annular groove is in a position where it would not interfere with the action of the balls in a standard tap adapter where the balls are intended to engage on the smooth round tap shank diameter for gripping purposes. Preferably, therefore, the groove 16 in the shank of the tap is below the point where the balls in a standard tap adapter would come in contact with the round shank. This, of course, permits the CNC tap to be used in any existing tap holding system as well as the adapters designed in conjunction with it.

In light of the foregoing, it can be observed that among objectives that have been achieved, there are the following advantages.

There is provided the optimum tap length for its overall capacity range, taking into consideration both metric and inch standards. This standard length makes programming simpler. Further, there is provided the optimum tap shank diameter and square again taking into consideration the capacity range. Further, there has been provided the optimum location for the annular groove on the tap which is in a position so that it functions with the improved quick-change spindle in the tapping attachment or tap drive or in the preferred form of tap adapter as identified herein which is compatible with all existing types of quick-change tapping attachments or tap drivers. The location of the annular groove does not prevent the tap from being used in any type of conventional tap holding device.

Having reference to standardized tap blank, a preferred exemplary form for one range has already been given, as shown in FIG. 1. This is the tap range from 0 to 5/16ths inch. In the range from ¼ inch to 9/16 inches or 6 mm to 14 mm, the overall length in this exemplary form should be 80 mm and the shank length should be 40 mm or more. In the ½ inch to 3/16 inch or 12 mm to 20 mm capacity range, the overall length of the tap should be 100 mm and the tap shank length should be 50 mm or more. The respective diameter shank and squares should be 6 mm×4.9 mm; 10 mm×8 mm; and 16 mm×12 mm. The dimensions given are for exemplary forms of a group of three such standardized taps. The three standardized taps having the capability of providing for accommodation to a great variety of situations as respects capacity and as respects thread sizes to be accommodated, both U.S. standard and British standard, and metric standards which would be made on the same blanks. All would have the same overall length and shank diameters and squares. Thus, there would be provided an international standard for accommodating CNC, that is computer numerical control applications.

As previously stated, among the advantages that would be realized include: one length for easy programming; one diameter shank for range of tap sizes, encompassing both metric and inch standard; quick-change without adapters, since the tap fits directly into the spindle of the tapping unit, resulting in better concentricity and positive lock, that is the tap cannot pull out; a tap adapter can be realized to hold the tap which would be adaptable to all existing tapping units with quick-change; and a manufacturer adapting a system as described would gain additionally in addition to the above advantage at tremendous reduction in the inventory of tap adapters that are required to be kept onhand as at present, since only the three standardized items as explained would be required to take the full range from 0 to 13/16 inch diameter and the metric equivalents as opposed to perhaps two hundred to handle all the various shank standards currently in use throughout the world.

Figure 8:
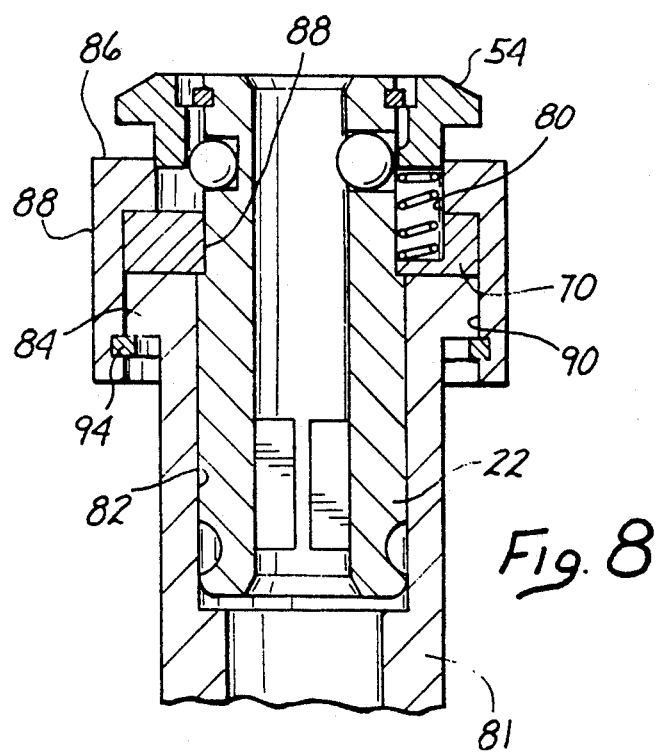
FIG. 8 is a cross-sectional view of the quick-change adapter built into the spindle of the tapping attachment to be driven directly.

FIG. 8 of the drawings illustrates a modified form of the invention, this being a construction wherein separate adapter as such is not utilized, but rather the adapter construction is built directly into the spindle of the driver or tapping attachment.

With respect to parts which are the same in this form of the invention as in the previous form of the invention, such parts are identified by the same numerals. Parts that are slightly different than corresponding parts are identified by the same numerals primed. The additional parts are identified by different numerals.

In FIG. 8, numeral 80 designates the spindle of the driver or tapping attachment. It has a bore 82 of a size to receive a body identified by the numeral 22 which is composed of parts like that of the adapter of the previous embodiment. At the upper end of the body 80 it has an extending flange 84. Numeral 70' designates a lock spring ring which is similar to the lock spring 70 of the previous embodiment similarly having three equally angularly spaced bores which receive three biasing springs, one of which is shown and designated by the numeral 80.

The spring ring 70' seats on the flange 84 of the spindle 80. The lock ring 54 is like that of the previous embodiment and operates similarly.

Numeral 88 designates a holding ring having a bore 90 of a size to fit around flange 84. At its upper end is an inwardly flange 86 which has a bore 88 of a size to fit around the outside diameter of the upper part of the body 22. Flange 86 fits over the spring ring 70'. The lower part of the ring 80 extends down below the flange 84 on the member 81 and it is held in position by way of snap ring 94.

From the foregoing, structure as shown in FIG. 8 is built directly into the driver or tapping attachment so that a separate adapter is not needed. Thus, this construction is able to accommodate for quick-change purposes all the applications that otherwise would be accommodated by a quick-change adapater as described in the foregoing.

From the foregoing, anyone skilled in the art will readily understand the nature of the construction of the invention and its mode of operation and utilization.

The foregoing disclosure is illustrative of representative forms of the invention and is intended to be illustrative rather than limiting upon the invention, the invention to be accorded the full scope of the claims appended hereto.

What is claimed is:

1. A tapping system comprising a set of taps and a tap holder for receiving the taps, each tap in said set of taps having a substantially cylindrical portion, an inner end having a substantially square cross-section for being received in a hole in the tap holder, and a shoulder positioned at the inner end of said cylindrical portion of the tap the tap holder further including a fitting axially movable with respect to the holder body and spring means biasing the fitting axially, a plurality of balls positioned to be engageable by the fitting, the balls being movable in a radial direction by the fitting, each tap having a groove for receiving the balls moved into the groove for holding the tap in position for accomplishing tapping, said set of taps including first taps, second taps, and third taps, said first taps being useable for a capacity range of cutting threads in the range of substantially 0-5/16 inch of thread diameter, the substantially cylindrical portion of said first taps having a diameter of substantially 6 millimeters, an inner end substantially 4.9 millimeters wide, a distance from groove to shoulder of substantially 15 millimeters and an overall length of substantially 60 millimeters, said second taps being useable for a capacity range of cutting threads of substantially ¼ inch-9/16 inch, the substantially cylindrical portion of said second taps having a diameter of substantially 10 millimeters, an inner end substantially 8 millimeters wide, a distance from groove to shoulder of substantially 20 millimeters, and an overall length of substantially 80 millimeters, and said third taps being useable for a capacity range of thread diameters of substantially ½ inch-13/16 inch of thread diameter, the substantially cylindrical portion of said third taps having a diameter of substantially 16 millimeters, an inner end substantially 12 millimeters wide, a distance from groove to shoulder of substantially 25 millimeters, and an overall length of substantially 100 millimeters, whereby said taps are holdable in position for tapping by means of said balls engaging with said groove and are holdable in position for tapping by frictional engagement with said taps without impinging on said groove.

2. A combination as in claim 1, wherein the said fitting is provided on the inside thereof with slots which engage with the said balls, whereby the said fitting is able to move the balls but is prevented from rotation relative to the balls.

3. A combination as in claim 1, including the said holder having a circular part adjacent the said fitting and constructed to provide a spring retainer for the said spring means.

4. A set of three tap blanks, said set of tap blanks including first tap blanks, second tap blanks, and third tap blanks, each said tap blank including a substantially cylindrical portion for accommodating cutting threads at an outer end and defining a groove for receiving balls such that said tap blank is holdable for tapping by means of balls engaging with said groove, and including an inner end having a substantially square cross-section for being received in a tap holder, said substantially cylindrical portion having a shoulder adjacent said inner end, said first tap blanks being usable for a capacity range of cutting threads of substantially 0-5/16 inch in thread diameter, said first tap blanks including a substantially cylindrical portion having a diameter of substantially 6 millimeters and a substantially square cross-section end substantially 4.9 millimeters wide, a distance from groove to shoulder of substantially 15 millimeters and overall length of substantially 60 millimeters, said second tap blanks being usable for a capacity range of cutting threads of substantially ¼ inch-9/16 inch in thread diameter, said second tap blanks including a substantially cylindrical portion having a diameter of substantially 10 millimeters and a square cross-section end substantially 8 millimeters wide, a distance from groove to shoulder of substantially 20 millimeters, and overall length of substantially 80 millimeters, said third tap blanks being usable for a capacity range of cutting threads of ½ inch-13/16 inch in thread diameter, said third tap blanks including a substantially cylindrical portion having a diameter of substantially 16 millimeters and a substantially square cross-section end substantially 12 millimeters wide, a distance from groove to shoulder of substantially 25 millimeters, and an overall length of substantially 100 millimeters, whereby said tap blanks are holdable in position for tapping by means of balls engaging with said groove and are also holdable in position for tapping by frictional engagement excluding said groove.

5. The invention as set forth in claim 4 wherein said first tap blank, said second tap blank, and said third tap blank comprise a set of tap blanks for said three capacity ranges whereby substantially all standard thread diameters of taps are included.

6. The invention as set forth in claim 4 wherein said first tap blanks are threaded with cutting threads substantially 0-5/16 inch in thread diameter, said second tap blanks are threaded with cutting threads substantially ¼ inch-9/16 inch in diameter, and said third tap blanks are threaded with cutting threads substantially ½ inch-13/16 inch in diameter, thereby forming a set of taps including substantially all standard thread diameters.

7. As an article of manufacture, in combination, a tap and a tap holder for receiving the tap, the tap being a cylindrical body having a standard predetermined length and standard predetermined diameter, the tap having a square end adapted to be received in a square hole in the tap holder, there being a radial shoulder formed at the end part of the tap adjacent to the square sides of the square end, the square hole in the tap holder providing a radial shoulder at the end of the hole adjacent to the sides of the square hold, the holder including a cylindrical fitting axially movable with respect to the holder body and spring means biasing the fitting axially, a plurality of balls positioned to be engagable by the fitting, the balls being movable in a radial direction by the fitting, the tap having an annular groove adapted to have the balls moved into the groove for holding the tap in position, the axial center of the said annular groove being positioned at a precise predetermined distance from the said shoulder at the end part of the tap, whereby axial thrust imparted to the tap is taken by the said shoulder and the shoulder at the end of the square hole rather than by the balls themselves, the said fitting being provided on the inside thereof with slots which engage with the said balls, whereby the said fitting is able to move the balls but is prevented from rotation relative to the balls, the said holder being constructed to be built into a driving apparatus or tapping attachment, the said driving apparatus having a part having a bore to receive the tap holder body, the said part having radially extending driving lugs, the said holder having a circular part constructed to fit around the spring retainer member and having driving lugs mutually engagable with the driving lugs on the said part.

* * * * *